Oct. 31, 1933. J. M. DAVIDSON 1,932,771

CHAIN DRIVE DEVICE

Filed Jan. 11, 1933

INVENTOR
John M Davidson
BY
ATTORNEY

Patented Oct. 31, 1933

1,932,771

UNITED STATES PATENT OFFICE 1,932,771

CHAIN DRIVE DEVICE

John M. Davidson, Batavia, N. Y., assignor to The Massey-Harris Co., Racine, Wis., a corporation of Maryland Application January 11, 1933. Serial No. 651,069

5 Claims. (Cl. 56—362)

My invention relates to chain drives such as generally are used on farm implements and the like, which are subject to serious distortion, thus moving the sprockets out of operative alignment.

It is well known that a chain drive when properly designed will operate successfully under moderate misalignment. However, in some implements such as hay loaders and the like having two forward and two rear carrying wheels, one wheel positioned at each corner of the frame, the frame is subjected to extreme distortion as the wheels individually travel over the uneven surface of a field.

In addition to the distortion caused by the wheels traveling over uneven ground surfaces and ditches, the rear rake bar crank is frequently considerably bent when the pick-up ends of the rake bars hit a raise in the ground or a large bunch of hay. Therefore, the sprockets on the end of the cranks are frequently moved so badly out of alignment with the driving sprockets that the chain will jump off or cause excessive wear and breakage.

It is well known that the above stated difficulties are largely at the free or approach side of the chain and that if the chain is properly directed on the approach side of a driven sprocket the difficulties will be avoided.

The object of my invention is to direct the chain in its approach to the driven sprocket so as to guide the chain at all times in operative alignment therewith, and in addition I also provide means for driving the rake bar sprocket in a reverse direction to the ground wheel sprocket without the use of gears or other complicated devices.

A further object of my invention is to provide for adjusting the free side of the chain by means of a sprocket suitably positioned between the driving and driven sprockets to thereby properly guide the chain, prevent sagging and side swing.

I accomplish the objects aforesaid by providing a relatively long bearing for the rake bar crank ends, adjacent its sprockets and having a rearwardly extending arm adapted to support an idler sprocket over which the free side of the chain passes before engaging the driven sprocket, whereby the approaching chain will always be held in alignment with the driven sprocket and by a suitably positioned tightener sprocket to thereby properly guide the chain in operative alignment with the idler sprocket.

To these and other useful ends, the invention consists in matter hereinafter set forth and claimed and shown in the accompanying drawing in which:

As thus illustrated, my invention consists of.

A main frame 10 which is preferably square or rectangular in shape, I provide front ground wheels 11 which are positioned at or near the front corners of the frame 10 and two rear caster wheels 12 which are suitably attached to and positioned near the rear corners of the frame 10.

Figure 2:
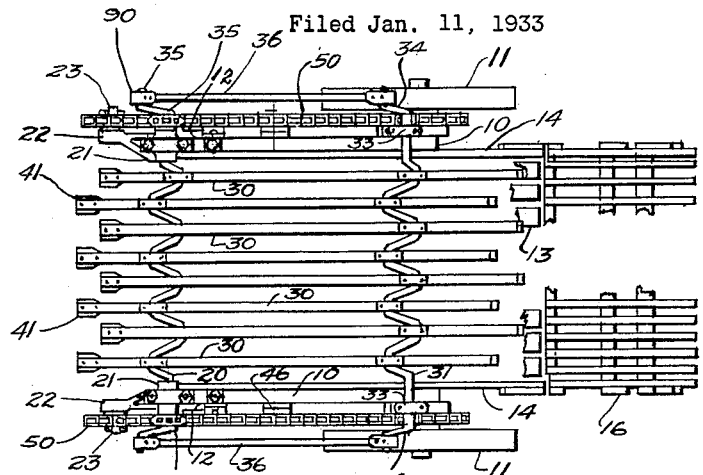
Fig. 2 is a fractional top view of the hay loader as shown in Fig. 1.
Figure 1:
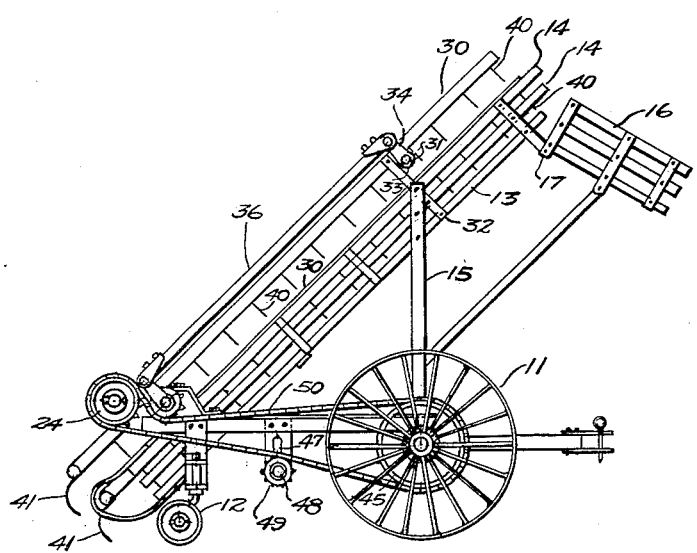
Fig. 1 is a side elevation of a hay loader illustrated as equipped with my invention.

A suitable hay conveyor platform 13 is provided with side retaining bars 14, thus forming an elevator trough which is attached to the frame 10 at the rear end thereof and extending forward and upward at an angle as indicated in Fig. 1 and is supported by the front end of the frame at each corner thereof by means of upright posts 15.

A suitable drop deck 16 is hingedly attached as at 17 to the front end of platform 13 in the usual well known manner.

Thus I provide a frame structure having four carrying wheels which is adapted to be attached to and pulled by a hay rack wagon in the usual well known way and in a manner too well known to require illustration and further description.

It will be seen that the frame of a structure of this design will be subjected to extreme distortion as it passes over the uneven ground, dead furrows, etc. It, therefore, must be a semi flexible structure and capable of adapting itself to such conditions.

I will now describe the working mechanism of the loader for which I provide means thereby to successfully operate the mechanism without injurious effect from the extreme distortion to which the frame of a loader of this design is subjected.

A rake bar operating shaft 20 is journaled to the rear corners of the frame 10 by means of relatively long bearings 21. These bearings are provided with rearwardly extendly arms 22 and forming an integral part thereof, at the rear end of which I secure shafts 23 which are adapted to rotatably support idler sprockets 24.

The ends of shaft 20 protrude from bearings 21. Upon these ends I secure driven sprockets 25. Thus it will be seen that regardless of how badly the frame 10 may be distorted or the shaft 20 is bent, the long bearings 21 will follow the shaft ends thereby to always hold the idler sprocket 24 in operative alignment with driven sprocket 25.

Upon the operating shaft 20 and between bearings 21 I form a multiple of preferably oppositely positioned cranks which are each adapted to operatively engage the rear ends of rake bars 30. The front ends of rake bars 30 operatively engage the cranks of shaft 31 which shaft is journaled to side posts 32 by means of bearings 33. The ends of shaft 31 protrude from bearings 33 and upon these ends I secure cranks 34 one at each end of the shaft and positioned preferably ninety degrees, one ahead of the other.

Cranks 35 are preferably an integral part of driven sprockets 25 and of the same length as cranks 34. One is positioned ninety degrees ahead of the other in exactly the same manner as cranks 34. These cranks are operatively connected by means of connecting rods or bars 36 whereby shaft 31 is turned by means of cranks 35. Each rake bar is, therefore, supported and operated by means of two cranks which are synchronous. Thus the rake bars 30 will rotate preferably alternately and in parallel relation.

The rake bars 30 are on their underside provided with a multiple of equally spaced pegs 40 and at the lower end of bars 30 I provide pick-up prongs 41. These prongs are suitably shaped whereby they will lift the hay from the ground and assist the adjacent pegs 40 to deposit the hay on the platform 13. The sprockets 25 are caused to rotate anti clockwise when facing the loader from the right hand side, therefore the rake bars 30 will operate correspondingly and move the hay to the drop deck 16.

The cranks on shafts 20 and 31 are of a length which will cause the pegs 40 to move the hay upward and to the deck 16 in a manner too well known to require further description.

Hay loaders of this design are relatively quite wide. Obviously, when one of the caster wheels drops into a dead furrow or the two caster wheels straddle a raise on the surface of the ground, considerable strain will be placed on the center rake bars 30 resulting in bending the shaft 20; this will not throw the sprockets 24 and 25 out of operative alignment for reasons which have been heretofore described.

Ground wheels 11 are each provided with driving sprockets 45. Brackets 46 are supported on frame 10 substantially midway thereof and are provided with a slot 47 and shaft 48 which is adapted to be made fast to the bracket in various positions in the slot and to rotatably support the idler sprocket 49.

The driving chain 50 on its loose side operatively passes from the ground wheel sprocket 45 from its under side to and over tightener sprocket 49, thence to the lower side of sprocket 24, around this sprocket to the under side of sprocket 25, thence to the top of sprocket 45.

Figure 3:
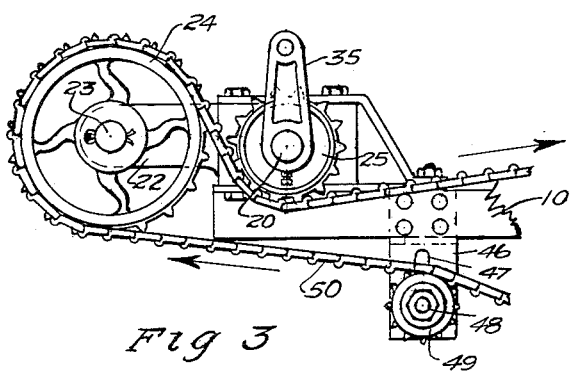
Fig. 3 is a fractional enlarged side view of my preferred form of chain tightening and aligning device.

Thus when the loader is traveling forward the chain will move in the direction indicated by arrows in Fig. 3. The chain will always approach the sprocket 25 in operative alignment thereto and the loose side of the chain will be held from sagging and swinging sidewise and when the frame 10 is badly twisted or distorted the sprocket 49 will be moved in a direction to insure the proper alignment of the chain and sprocket 24.

Obviously, many detail changes in shapes and position of parts may be made without departing from the scope of my invention, and further my invention is adaptable to many uses, particularly farm implements and other devices of similar requirements. And while I have shown my drive on both sides of the loader, one of these drives may be dispensed with when found advisable.

Having thus shown and described my invention, what I claim as new and desire to secure by Letters Patent is:

1. A chain drive device, comprising a semi flexible frame, four ground wheels positioned one at each corner of said frame, rake bars, and an operating crank shaft therefor, said crank shaft positioned transversely at or near the rear end of said frame, a driven sprocket attached to one end of said crank shaft, a relatively long crank shaft bearing positioned adjacent said driven sprocket and having a rearwardly extending arm having an idler sprocket thereon whereby said idler sprocket is held in operative alignment with said driven sprocket, a front ground wheel sprocket and a drive chain operatively engaging said ground wheel sprocket, idler sprocket and driven sprocket, whereby said driven sprocket is caused to turn in a direction opposite to said ground wheel sprocket.

2. A chain drive device, comprising a semi flexible frame, four ground wheels mounted on said frame one at or near each corner thereof, rake bars and an operating crank shaft therefor and positioned transversely at or near the rear end of said frame, driven sprockets on the ends of said crank shaft, relatively long bearings for said crank shaft positioned adjacent said driven sprockets each having rearwardly extending arms having idler sprockets rotatably mounted thereon, whereby said idler sprockets are held in alignment with said driven sprocket, sprockets on the front ground wheels, drive chains operatively engaging said sprockets whereby to turn said driven sprocket in an opposite direction to said ground wheel sprocket.

3. A chain drive device, comprising a semi flexible main frame, two front and two rear ground wheels attached to or near the corners thereof, an operating shaft positioned transversely and at or near the rear end of said frame, a driven sprocket attached to one end of said shaft, a relatively long supporting bearing for said shaft and positioned adjacent said driven sprocket and having a rearwardly extending arm having an idler sprocket rotatably supported thereon to thereby hold said idler sprocket in operative alignment with said driven sprocket, a front ground wheel sprocket and a chain adjusting idler sprocket, said chain operatively engaging said sprockets whereby said driven sprocket will be turned opposite to said ground wheel sprocket, said chain tightening sprocket supported by said frame midway thereof and adapted to carry the loose side of said chain.

4. A chain drive device, comprising a frame, four ground wheels on said frame one at or near each corner thereof, rake bars and an operating crank shaft therefor positioned transversely at or near the rear end of said frame, a driven sprocket attached to one end of said crank shaft, a relatively long bearing for said crank shaft positioned adjacent said driven sprocket and having a rearwardly extending arm having an idler sprocket supported thereon whereby said idler sprocket is held in alignment with said driven sprocket, a front ground wheel sprocket, a chain tightener sprocket and a chain operatively engaging said sprockets whereby said driven sprocket is turned in opposite direction to said ground wheel sprocket, said chain tightening sprocket adapted to support said chain midway said ground wheel and said idler sprockets thereby to prevent sagging and side swinging of said chain.

5. A chain drive device, comprising a supporting frame, a front driving sprocket, a rear shaft and a driven sprocket attached to the end thereof, a relatively long bearing for said shaft positioned adjacent said driven sprocket and having a rearwardly extending arm and an idler sprocket rotatably mounted thereon, whereby said idler sprocket is held in operating alignment with said driven sprocket, a chain operatively engaging said sprockets whereby said driven sprocket is turned in an opposite direction to said front driving sprocket, an adjustable tightener sprocket adapted to support the free side of said chain and positioned between said front driving and idler sprockets.

JOHN M. DAVIDSON.